Feb. 20, 1940.  C. B. STRAUCH  2,190,809
FABRICATOR FOR ADHESIVE TAPE
Filed May 18, 1936   2 Sheets-Sheet 1
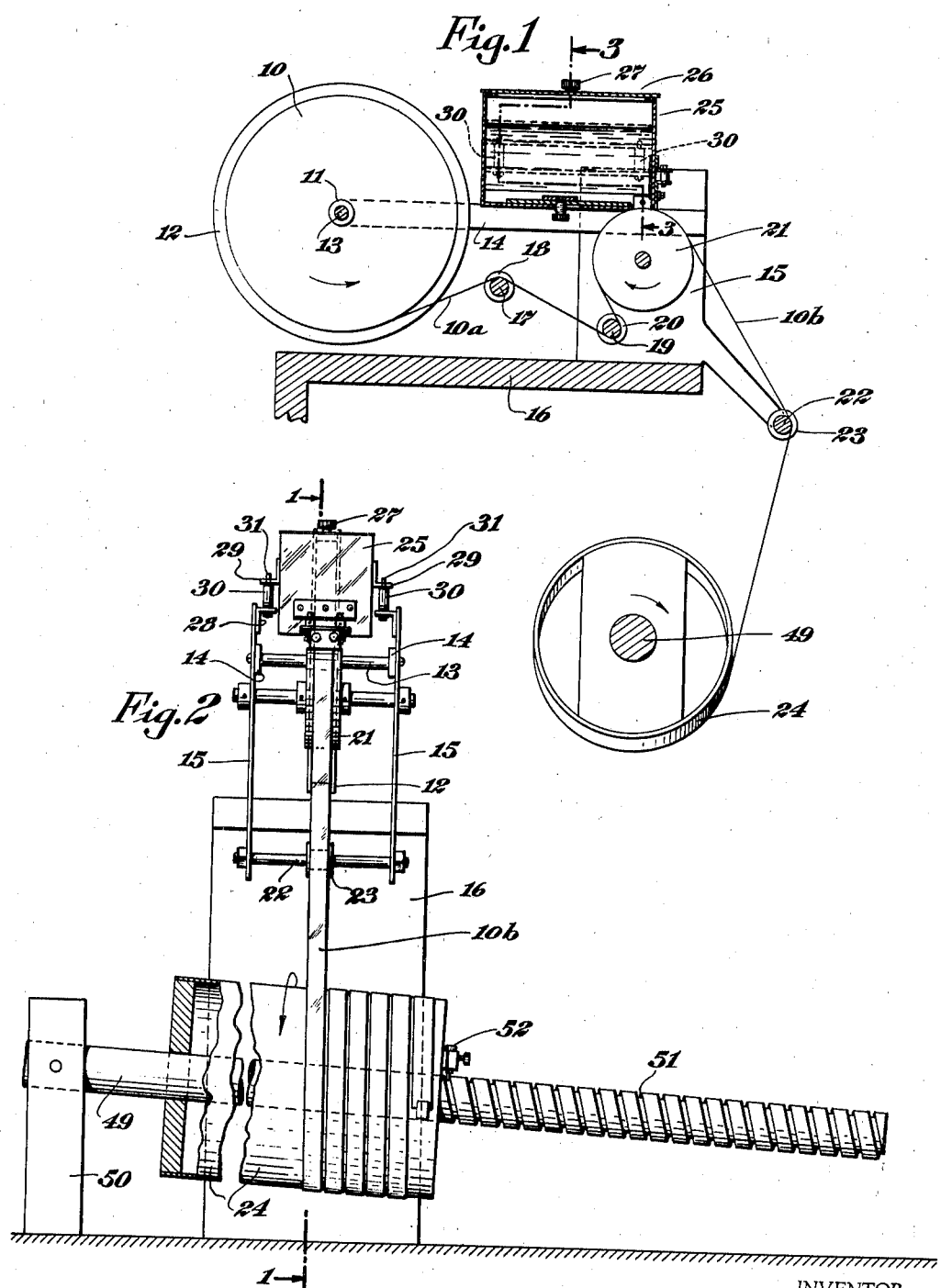
INVENTOR,
Clauss Burkart Strauch,
BY Paul Carpenter
ATTORNEY.

Feb. 20, 1940.   C. B. STRAUCH   2,190,809
FABRICATOR FOR ADHESIVE TAPE
Filed May 18, 1936   2 Sheets-Sheet 2
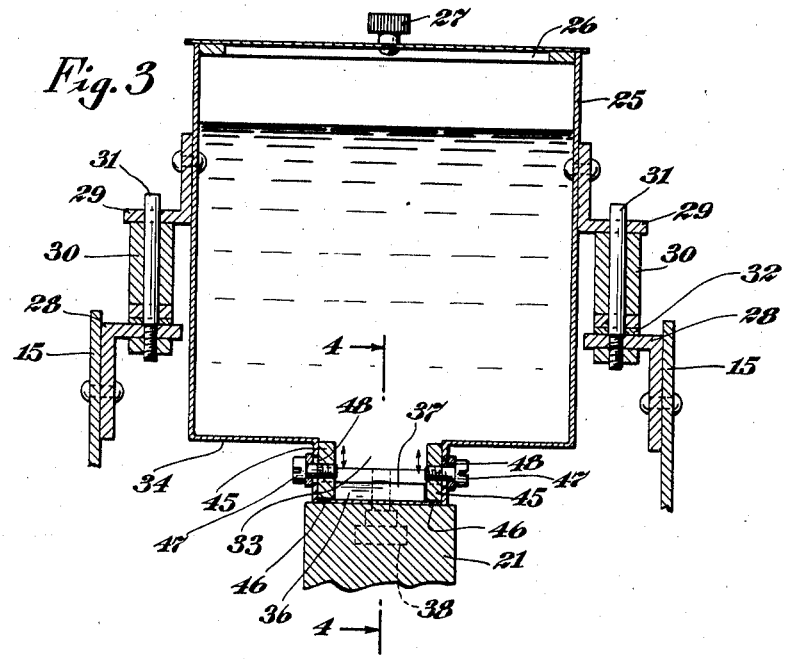
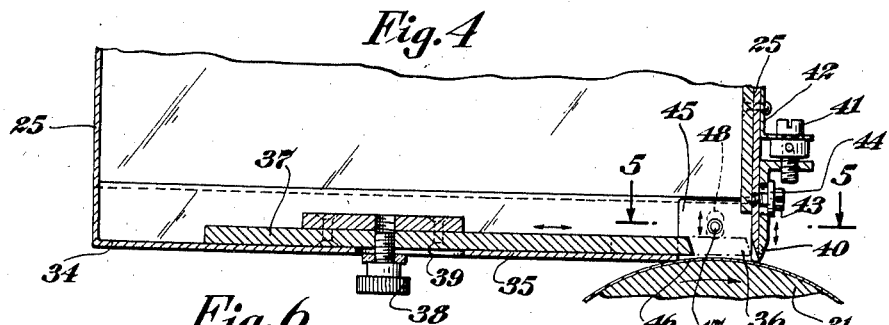
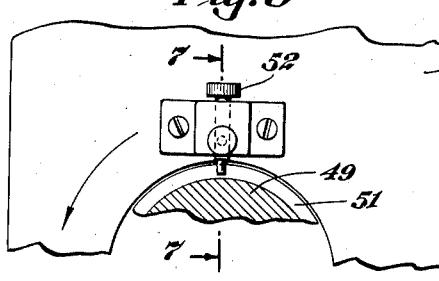
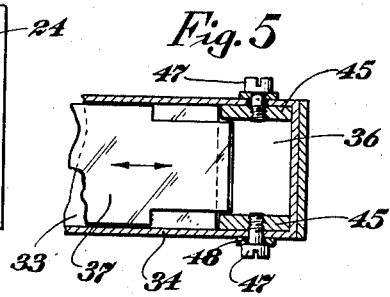
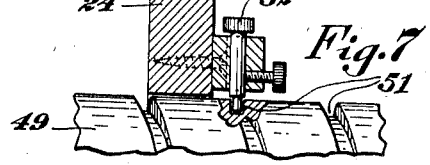
INVENTOR,
Clauss Burkart Strauch,
BY Paul Carpenter
ATTORNEY.

Patented Feb. 20, 1940

2,190,809

UNITED STATES PATENT OFFICE 2,190,809

FABRICATOR FOR ADHESIVE TAPE

Clauss Burkart Strauch, New York, N. Y., assignor to Minnesota Mining & Manufacturing Company, St. Paul, Minn., a corporation of Delaware Application May 18, 1936, Serial No. 80,410

9 Claims. (Cl. 91—43)

This application is a continuation in part of my co-pending application Serial No. 65,807, filed February 26, 1936, and among other things relates to my co-pending applications Serial No. 99,588 filed March 6, 1935, and Serial No. 54,455 filed December 14, 1935 and to two certain applications for Letters Patent executed by me on April 20, 1936, and respectively entitled "Adhesive tape and method of making the same" and "Adhesive and method of making the same", Serial Nos. 80,408 and 80,409, respectively, filed May 18, 1936.

This invention relates to apparatus for the fabrication of sheeted adhesive materials and finds a field of particular utility in the manufacture of adhesive tape or strips. Obviously this apparatus may be used for coating other materials.

This invention also relates to an improved apparatus for the application and coating of slowly or non drying adhesives or the like.

The invention further contemplates the provision of an improved means for winding and storing the coated product, and protecting the exposed surface from undesired contacts.

It is an object of my invention to provide an apparatus which combines not only the features of simplicity of design but simplicity of operation, which obviously mean establishing economies of manufacture by lowered original cost and lowered cost of operation. By use of the apparatus of my invention materials may be coated and adhesive tapes prepared by untrained operators without any difficulty.

It is also an object of my invention to do away with costly and complex apparatus by combining all of the parts needed in the fabrication of adhesive tapes or strips within a small convenient compass.

In addition, it is an object of my invention to provide practical means for the fabrication of adhesive sheets and tapes in such a manner that the adhesive surfaces remain untouched after coating until use. By so doing two objects, among others, are accomplished. In the first place no limitation of low adhesiveness is imposed upon the product produced by my apparatus such as is the case where slip-sheets are required, or where the tape is wound into rolls. In the second place the cost necessarily entailed where slip sheeting and separate winding into rolls are required, due to the additional materials, is entirely eliminated.

A further object of my invention is the production of an improved apparatus for spreading or coating a large variety of liquids and semi-liquids.

My invention contemplates such other and further objects as will appear as the description of my invention and apparatus proceeds.

In attaining the foregoing objects, together with such further benefits, advantages and capabilities as may hereafter appear and as are inherently possessed by my apparatus, I use the construction shown in preferred form in the accompanying two sheets of drawings.

Referring to the drawings—

Figure 1 is a vertical section of the complete assembly taken on the line 1—1 of Figure 2 and looking in the direction of the arrows;

Figure 2 is a front elevation of the complete assembly;

Figure 3 is a fragmentary transverse section of the fluid reservoir;

Figure 4 is a fragmentary longitudinal section of the lower portion of the fluid reservoir, taken on the line 4—4 of Figure 3;

Figure 5 is a fragmentary horizontal section showing the dispensing aperture in top plan view, and taken on the line 5—5 of Figure 4 looking in the direction of the arrows;

Figure 6 is a fragmentary detail of the winding assembly; and

Figure 7 is a fragmentary detail, partly in vertical section and partly in elevation indicated by the line 7—7 in Figure 6.

Referring now more particularly to the drawings I have indicated a supply roll of sheeted material to be coated, at 10, which is wound on the core 11. On either side of the material 10 and to keep it in position for proper feeding, I have provided guide discs 12 of slightly larger diameter. The core 11 rolls freely upon rod 13 which is attached in any suitable way to the adjustable arms 14. These arms 14 are adjustable laterally primarily for the purpose of exerting tension during the unwinding of the material 10. The arm members 14 are so attached to the frame members 15 which in turn are rigidly attached by any suitable means to the base member 16.

As the material 10 to be coated is dispensed as shown by the single strip 10a it is taken up over guide roller 17 provided with guide discs 18, then around guide roller 19, provided with guide discs 20 to roller 21, and receives its coating. The coated material 10b passes from the roller 21 over a guide roller 22 provided with guide discs 23 and is wound upon the receiving drum 24. This winding is performed in such a manner that the coated tape 10b is wound helically upon the drum 24.

Referring to the means for supplying and applying the coating to tape or strip to be coated, reference is particularly made to Figures 1, 3, 4 and 5, wherein the fluid reservoir is indicated at 25. I have shown this provided with a cover 26 and a knurled knob 27 for easy removal. The reservoir 25 is attached to the frame members 15 by means of facing angle members 28 and 29 and separated by spacing member 30, 30. To facilitate the removal of the reservoir 25, I have provided threaded stub shafts 31 with annular flanges 32 which rest upon the angle supports 28 and extend upwardly through apertures provided therefor in the angle members 29. It will be seen therefore that although the reservoir 25 is held securely at four points by means of said stub shafts 31 it may be easily removed by simply lifting it upwardly.

The reservoir 25 is preferably provided with a channel 33 in the bottom thereof 34. This channel 33 I have shown substantially the same width as the material to be coated. It is obvious that this channel may be made of any width desired or may be made adjustable in respect of width. At one end of the channel 33 and in the bottom portion thereof 35 I provide an aperture 36 through which the fluid coating material flows or is deposited upon the material being coated. Slidably mounted in the bottom of the channel 33 is a shutter 37 for closing or controlling the amount of flow through the aperture 36. Adjustment may be made by the knurled screw 38 which slides in groove 39 in the bottom of the channel 35.

The thickness of the coating is controlled by the adjustable doctor blade 40, the vertical movement of which is controlled by the screw 41 mounted in the bracket 42 on the face of the reservoir 25. Optionally I provide also adjustable means for holding the doctor blade 40 firmly in position after the vertical adjustment is made by the screw 43 and lock washer 44.

Not infrequently the roll 21 which contacts with the aperture 36 becomes fouled with the fluid coating the materials and to remedy this situation I have provided adjustable members 45, 45, placed at either side of the channel 33 the lower surfaces of which, at 46, are curved to conform with the arc of the roller 21. It will be seen that when these are in lowered position the flow of fluid will be limited in width so that the coating will not extend to the extreme marginal edges of the material being coated. In this manner, there is no opportunity for the coating to spread or leak over the marginal edges of the material 10a and so befoul the roller 21. The members 45 may be taken out of operative engagement by loosening screws 47, 47, and moving them upwardly in the slots 48, 48.

As the coated material 10b is coated it is delivered to the drum 24 and helically wound thereon. The drum 24 is revolvably mounted upon a shaft 49 which is adjustably mounted at one extremity in base member 50. The periphery of the shaft 49 is provided with a thread or helical groove 51.

The shaft 49 is pivotally mounted on the base portion 50. The shaft pivots in a vertical plane and may be raised from the position shown in Fig. 2 to facilitate removal of the wound drum so that the coated tape or the like is delivered to the peripheral surface of the drum 24 in the same plane, thus preventing any crinkling or unevenness in the helical winding.

The helical winding is attained by rotating the drum 24 on the shaft 49 and the distance moved is controlled by a pin 52 which is attached in any suitable way to the drum 24 and which engages the screw or groove 51 in the shaft 49 and travels therein until the winding is complete on the particular drum. The threads or helical grooves 51 are preferably cut in such steepness that each full turn of the guided drum 24 will move the drum on its axis sideways a trifle more than the width of the tape to be coated.

When the winding on the drum is complete the pin 52 is taken out of functional engagement and the drum 24 removed for storage or use.

It is believed that in describing the apparatus, the manner of its use has become thoroughly apparent.

In the form of the apparatus shown herein the drum 24 is rotated manually thus drawing the material being coated through the entire apparatus but obviously any mechanical means for rotating the drum and thereby operating the apparatus is contemplated.

Having thus described my invention and illustrated its use what I claim as new and desire to secure by Letters Patent is:

1. In a coating machine, in combination with a reservoir and means for supplying material in position to receive fluid from said reservoir, a shaft, means for imparting movement to said material including a drum detachably carried on said shaft for receiving said material as produced, the said drum being displaceable pivotally and laterally in order that the coated material may be helically wound thereon without distortion.

2. In a coating machine, in combination with a reservoir and means for supplying material in position to receive fluid from said reservoir, a winding up drum for receiving material as produced, and means for inducing lateral movement to the drum including a member provided with a helix for controlling said movement, and a pin member detachably carried by said drum and engaging said helix.

3. In a coating machine, in combination with a reservoir and means for supplying material in position to receive fluids from said reservoir, means for imparting movement to said material including a pivotally mounted threaded shaft and a drum for receiving said material as produced, the said drum being readily detachable and revolvably mounted upon said threaded shaft and movable longitudinally thereon in order that the coated material may be helically wound thereon without distortion.

4. In a coating machine, in combination with a reservoir and means for supplying material in position to receive fluid from said reservoir, means for imparting movement to said material including a pivotally mounted shaft having helical grooves, and a drum detachably mounted thereon for receiving said material as produced, the said drum being provided with means revolvably carried in the grooves of said shaft in order that the coated material may be helically wound about said drum without creasing or folding.

5. A device as specified in claim 4 including a pin member detachably carried by said drum and engaging the helical groove of said shaft.

6. In a device of the class described, means for applying adhesive to one side of a moving tape, and a rotatable drum adapted to receive said moving tape removably carried on a screw-threaded shaft, said drum being disposed at an angle to said adhesive applying means and movable along its longitudinal axis.

7. In a device of the class described, an adhesive receptacle having an opening provided with an adjustable shutter and adapted to emit adhesive to be applied in a thin layer to one side of a moving strip, a roller adjacent thereto to guide said moving strip across said opening, and a rotatable cylindrical member removably carried on a screw-threaded shaft disposed at an angle to said roller and movable longitudinally along its axis to receive said strip in spirals.

8. In a device of the class described, means for applying adhesive to one side of a moving strip of predetermined width, a helically threaded shaft adjacent said means, the space between said threads being slightly greater than the width of said strip for each revolution of said shaft, and a drum removably and rotatably mounted on said shaft and movable longitudinally along the axis thereof in said threads, whereby said strip may be wound spirally thereon without overlapping or creasing.

9. In a device of the class described, a source of strip material to be coated, means for applying adhesive to one side of said moving strip, and a rotatable drum removably positioned on a shaft provided with a helical groove, the pitch of said groove being slightly greater than the width of said strip, to receive said moving strip from said adhesive applying means, said drum being movable along its longitudinal axis, whereby said strip may be wound thereon without overlapping or forming folds.

CLAUSS BURKART STRAUCH.